Aug. 25, 1925.
F. A. KING
1,550,820
MOUNTING FOR WINDSHIELD SPOTLIGHTS
Filed April 4, 1922
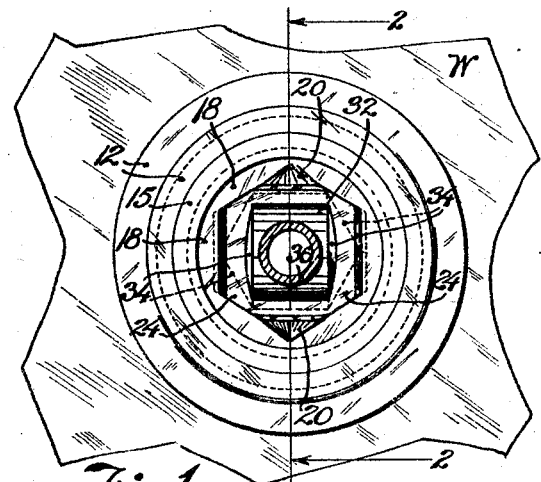
Fig. 1.
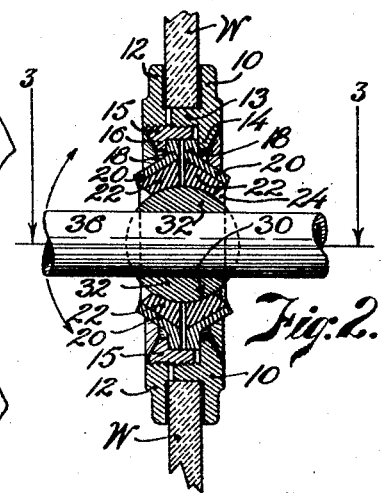
Fig. 2.
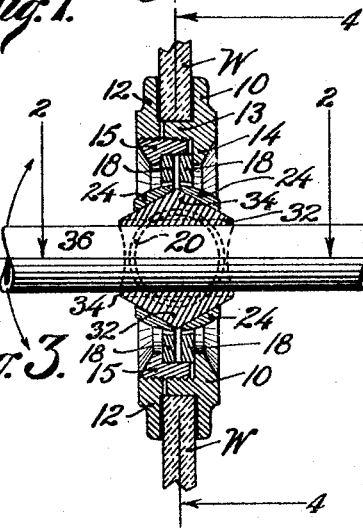
Fig. 3.
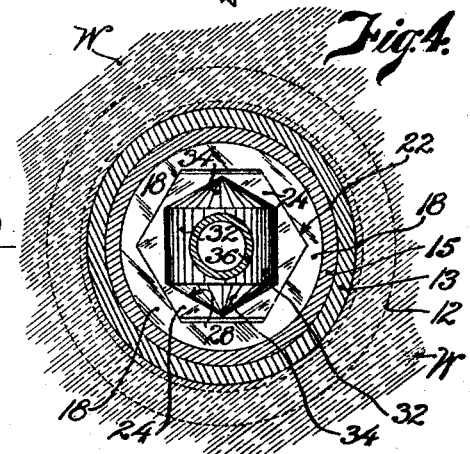
Fig. 4.
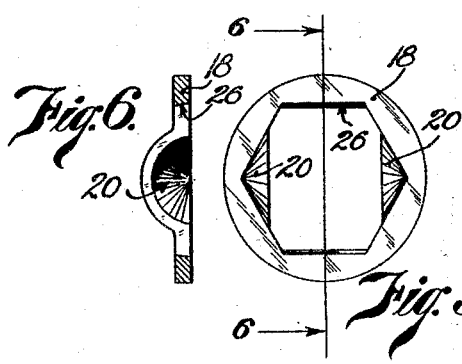
Fig. 6.   Fig. 5.
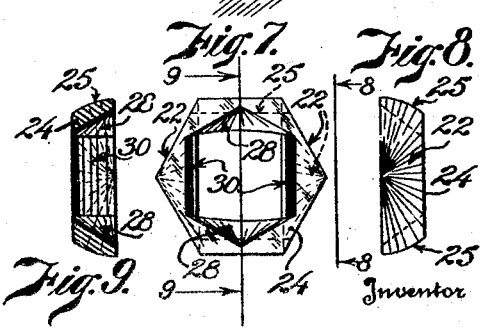
Fig. 7.   Fig. 8.
Fig. 9.
Inventor
F. A. King.
By Lynn L. Steele
Attorney.

Patented Aug. 25, 1925.

1,550,820

UNITED STATES PATENT OFFICE.

FRANK A. KING, OF ENGLEWOOD, COLORADO.

MOUNTING FOR WINDSHIELD SPOTLIGHTS.

Application filed April 4, 1922. Serial No. 549,524.

*To all whom it may concern:*

Be it known that I, FRANK A. KING, a citizen of the United States, and resident of Englewood, in the county of Arapahoe, State of Colorado, have invented certain new and useful Improvements in Mountings for Windshield Spotlights; and I do declare the following to be a full, clear, and exact description of the invention, such as will enable others skilled in the art to which it appertains to make and use the same, reference being had to the accompanying drawings, which form a part of this specification.

The object of this invention is to provide a simple and efficient means for mounting a spotlight or the like upon the windshield or other apertured support of an automobile or truck.

Briefly the invention comprises a cylinder or block having bearings at its ends which are mounted in seats or bearings surfaces of a pair of plates opposed to each other, each of which in turn has a pair of bearings working in seats or bearing surfaces carried by a pair of opposed rings mounted in an aperture of a windshield or the like. Preferably these rings are secured upon another ring or annular member adapted to be mounted directly upon the windshield and to be held in such position by means of a retainer which conveniently is in the form of a locking ring. The cylinder carries a spotlight stem or spindle which is thus shiftable in any direction by reason of the two pivotal mountings which preferably are upon axes at right angles to one another.

In the accompanying drawings wherein one embodiment of the invention is disclosed, Fig. 1 is a face elevation of the mounting;

Fig. 2 is a vertical section therethrough taken on line 2—2 of Fig. 1;

Fig. 3 is a horizontal section taken on line 3—3 of Fig. 2;

Fig. 4 is a median vertical section taken on line 4—4 of Fig. 3;

Fig. 5 is an inner-face elevation of one of the opposed bearing rings, and Fig. 6 is a section therethrough on line 6—6 of Fig. 5;

Fig. 7 is an inner-face elevation of one of the opposed bearing plates, Fig. 8 being an end elevation thereof as indicated by line 8—8 of Fig. 7, and Fig. 9 being a section therethrough taken on line 9—9 of Fig. 7.

The mounting is shown as being supported within an aperture in a glass windshield W, and is directly mounted thereupon by a pair of windshield-engaging retainers in the form of a positioning and retaining ring 10 and a locking ring 12. Positioning ring 10 has a threaded flange 13 and an annular retaining shoulder 14, a tensioning ring 15 which also has a retaining shoulder 16 of annular form being threaded into the flange 13. The locking ring 12 is threaded onto the tensioning ring 15 and thereby retains all the assembled parts as a unit upon the windshield.

Positioned between the shoulders 14 and 16 of the rings 10 and 15 is a pair of opposed bearing rings 18, each of which has a pair of diametrically positioned approximately semi-conical bearing cups 20 which receive within them the approximately semiconical bearings 22 of a pair of opposed bearing plates 24. These bearing parts are alined so that adjacent pairs produce conical bearings or pivots upon which the plates 24 are adapted to swing within the bearing rings 18, and said plates are of a size to neatly fit the rings 18 and normally close the same. In vertical elevation the outlines of the plates 24 are polygonal as best seen in Fig. 7, the bearings 22 thereof being adapted to work in the cups 20, and the rest of said plates being adapted to swing outward through correspondingly shaped openings in the bearing rings 18. For this purpose, the ends of plates 24 are curved on the face of a cylinder as seen at 25, Figs. 7, 8 and 9, and these curved faces work against similarly curved faces 26 on said rings 18 as seen in Figs. 5 and 6.

Within each bearing plate 24 a pair of oppositely disposed semi-conical bearing faces or cups 28 are provided and between these cups 28 the inner walls of the plates are partially cylindrical as indicated at 30. The two plates 24 receive between them a cylindrical body 32 having at its ends conical bearings 34 which are adapted to rotate in the cups 28 while the cylindrical portion 32 works against the curved walls 30. A spotlight stem or spindle 36 passes through the cylinder 32, whereby the spotlight on one side of the windshield may be adjusted from the other side thereof.

By means of this construction the light may be adjusted in a vertical plane as indicated by the small arrows of Fig. 2, whereupon the cylinder 32 works within the plates 24, the bearings 34 rotating on the faces 28. The light may also be adjusted in a horizontal plane as indicated by the small arrows of Fig. 3, in which case the plates 24 swing within the rings 18, the bearings 22 rotating in the cups 20 and the faces 25 working against the faces 26 of the rings 18. By combining the two movements, the light may be adjusted to any angle or position desired. By removing the locking ring 12, the whole mounting may be drawn outward from its position within the aperture of the windshield.

I claim:

1. In combination, a support having an aperture therein, a pair of rings carried by said support and having oppositely disposed bearing cups thereon, a pair of bearing members mounted within said rings and having bearings working in said cups, and a light carrier rotatable upon said pair of members.

2. In combination, a support having an aperture therein, a pair of rings carried by said support and having bearing cups thereon, a pair of plates mounted in said rings and having bearings working on said cups and held thereby, said plates having bearing surfaces thereon, a journal having bearings rotatably engaging said surfaces and held thereby, and a light carrier passing through said journal and said aperture and movable with said journal.

3. In combination, a support having an aperture therein, a pair of rings having bearing cups thereon, a pair of bearing members having bearings mounted within said cups and held together thereby, a light carrier pivotally mounted within said members and held thereby, and means for removably mounting said rings and members upon said support at said aperture and permitting removal therefrom as a unit.

4. In combination, a support having an aperture therein, a pair of rings having bearing cups thereon, a pair of bearing members having bearings mounted in said cups and between said rings whereby said rings retain said members, a light carrier having bearings rotatably mounted in and between said members and held thereby, and means for mounting the parts on said support at said aperture engaging and retaining said rings in operative position and thereby tensioning the parts and maintaining them in operative relation.

5. In combination, a support having an aperture therein, a pair of rings having bearing cups, means binding said rings together and connecting them with said support at said aperture, a pair of plates having bearings mounted inside of said cups and held by said rings, a cylindrical body within said plates having bearings at its ends, said plates being recessed interiorly to receive said cylindrical body and its bearings, whereby said body is journaled in said plates and retained thereby, and a light-carrier mounted upon said body.

6. In combination, a support having an aperture therein, a pair of ring members connected with said support adjacent said aperture, said members having bearing surfaces, a pair of plates having bearings journaled on said members, a cylindrical body having bearings at its ends mounted within said plates for rotary movement on the axis of its bearings, and a light carrier on said body and passing through said aperture.

7. In combination, a support having an aperture therein, a pair of rings connected with said support adjacent said aperture, a pair of plates having partially cylindrical sides and conical bearings journaled in said rings engaging corresponding surfaces of said rings, a cylindrical body having conical bearings journaled in said plates and engaging corresponding surfaces thereof, and a light carrier in said body and projecting through said aperture.

8. In combination, a support for a light having an aperture therein, a pair of members engaging the opposite sides of said support at said aperture and having a pair of spaced bearings with a common axis, a second pair of members engaging said bearings and swinging thereon and also having bearings, and a light carrier mounted to swing upon said second bearings and passing through said aperture.

In testimony whereof I affix my signature.

FRANK A. KING.